June 24, 1930.  J. F. WAIT  1,765,386

PRODUCING NONTURBULENT CIRCULATION OF LIQUIDS

Filed Jan. 17, 1925

Justin F. Wait, INVENTOR

BY Chas. W. Mortimer ATTORNEY

Patented June 24, 1930

1,765,386

UNITED STATES PATENT OFFICE

JUSTIN F. WAIT, OF NEW YORK, N. Y., ASSIGNOR TO NATIONAL ANILINE & CHEMICAL CO., INC., A CORPORATION OF NEW YORK

PRODUCING NONTURBULENT CIRCULATION OF LIQUIDS

Application filed January 17, 1925. Serial No. 3,205.

This invention relates to a device by which circulation of liquids can be set up in a body of liquid so as to permit smooth flow or flow without causing appreciable amounts of eddy currents or a great deal of turbulency. It relates especially to a device by which circulation of liquids can be set up by propelling means such as an ordinary propeller, for example, although it is not restricted to this particular way of setting up the circulation of liquids.

The invention is especially useful in situations where it is desired to prevent solids that are heavier than the liquids in which they are contained from settling to the bottom and remaining there. The invention is also very useful where it is desired to keep particles of solid matter that are lighter than the liquid submerged below the surface of the liquid. At the same time the circulatory paths of the liquid are so disposed that very little power consumption is required to produce the circulation of the liquid due to the fact that eddy currents are almost, if not entirely, eliminated. The liquid is preferably caused to flow at least through a portion of its path in a vertical plane and the stream of liquid is caused to separate or spread radially after the impulse has been given thereto and to return to the same place along different paths.

The invention will be understood from the description in connection with the accompanying drawings, in which Fig. 1 is a vertical section through the device;

Figure 1:
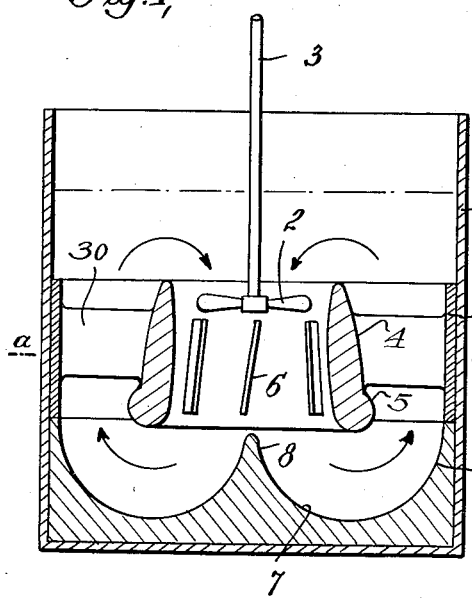

In the drawings reference character 1 indicates a vessel in which is mounted a propeller 2 that may be driven by the shaft 3 from any convenient source. The propeller 2 is preferably mounted so that it will force the liquid in a vertical direction and is enclosed within the draft tube 4 whose walls are vertically curved on opposite surfaces and diverge slightly in a downward direction, the lower edge or rim thereof being provided with a bead or rounded portion 5 for a purpose to be subsequently described. The inner surface of the draft tube 4 is provided with vertically disposed, radially projecting baffles 6. A dished diverter plate 7 is mounted in the bottom of the vessel 1 and has a conically shaped projection 8 extending along the line of the axis of the draft tube 4. The bottom thereof may be considered as being annular trough-shaped of curvilinear cross section. The diverter plate 7 is shaped so that the outer perimeter thereof extends upwardly as shown at 9 thus providing a smooth curved path for the liquid that impinges against the same.

In case the device is to be used for circulating fluids that are of a corrosive character, the corrosion is generally magnified by the high velocities of liquid obtained and erosion is likewise often increased. To overcome the above difficulties encountered with the increased velocity of the liquid, the deflecting parts and special liners used as surfaces to restrain the flow of the liquid are preferably made of materials which will stand both corrosion and erosion. They are also preferably made in sections to facilitate removal from the vessel. For example, the surfaces 7, 8 and 9 in Fig. 1 might be made in 8 parts and the special liner 10 made in 4 parts which would offer convenient sizes for both casting the material and for installing and removing it from the vessel. Instead of making the parts that are subject to corrosion in sections to be removed when worn, these parts may be covered with thin sheets or plates of the proper shape to divert the liquids and to take up the corrosion. These thin removable sheets or plates may be removed when corrosion has taken place and new sheets of the same sort substituted therefor.

Figure 3:
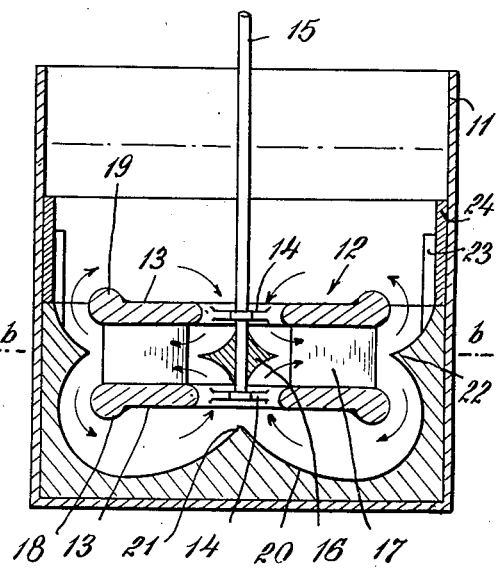
Fig. 3 is a vertical section through a modification.
Figure 2:
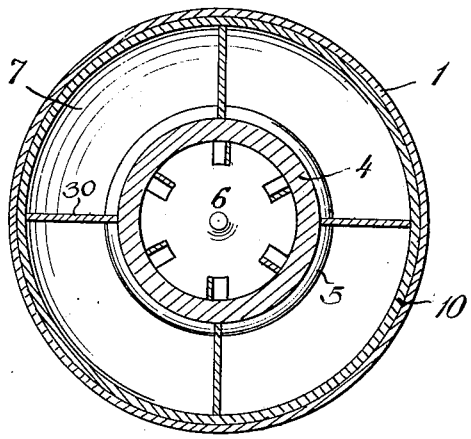
Fig. 2 is a section along the line a—a of Fig. 1.
Figure 4:
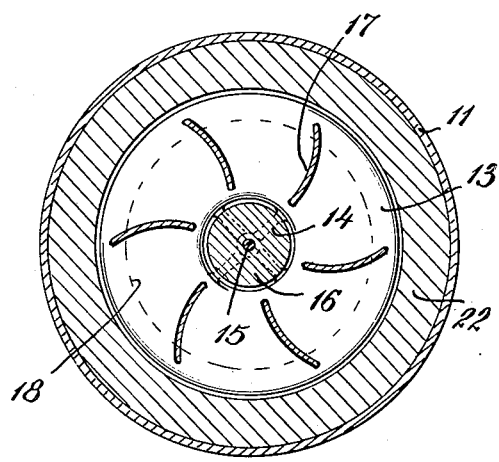
Fig. 4 is a section through the line b—b of Fig. 3.

In the modification shown in Figs. 3 and 4, the vessel 11 is provided with a propeller 12 of the impeller type which comprises two thick discs or concentric walls 13 that are connected by means of the spiders 14 to the shaft 15 that is driven in any convenient manner. A deflecting member 16 is mounted upon the shaft 15 between the discs 13. This deflector member consists in effect of two cones with their bases coinciding but with the portions which would otherwise correspond to elements of the cones preferably curved inwardly so as to make slightly concave surfaces. A series of radially spaced plates 17 are mounted between the discs 13 and perpendicular thereto for the purpose of giving impulse to the liquid that passes outwardly between the plates 17 and the discs 13. These plates 17 may be slightly curved to improve the operation. The outer edges of the plates or walls 13 may be enlarged or provided with beads 18 and 19 to cause a viscous or non-turbulent flow of material around the same as the direction of flow of the liquid is reversed.

The vessel 11 may be provided with a dished diverter plate 20 with a conical portion 21 in the axial line of the shaft 15 and with the surfaces curved as indicated to produce a gradual change of direction or viscous flow of the liquid as indicated by the arrows. The diverter plate 20 may extend upwardly along the sides of the vessel and have an annular V-shaped extension 22 located opposite the outlet from between the discs 13 and plates 17. The sides of this extension 22 are likewise made of a gradual curvature to cause non-turbulent flow. The curvatures of the sides of the extension 22 and the rims 18 and 19 are so disposed with respect to each other that the liquids flow smoothly therebetween. Baffle plates 23 may be mounted in radial directions extending from the inner walls of the vessel 11 and the vessel may be provided with a removable plate 24 to prevent corrosion of the vessel itself.

The operation is as follows: The liquid and solid particles are charged into the vessel 1 and the propeller 2 is rotated causing downward motion of the liquid through the draft tube 4, the swirling action of the liquid being subdued by means of baffles 6. The direction of flow of the liquid is altered by the surfaces of the deflecting plates 7, 8 and 9 causing reversal of the direction of flow, the liquid then assuming an upward direction and carrying with it the heavier particles which would otherwise settle and remain at the bottom of the vessel. As the liquid flows upward the direction is again changed and the particles complete their cycle by passing through the zone of action of the propeller 2. Sudden reversal of direction as the liquid passes around the lower edges 5 of the draft tube 4 is prevented by making this edge of sufficient radius as may be accomplished by enlarging the section of the metal as indicated. The flow of the liquid between the surface of 5 and that of 7, 8 and 9 is therefore less turbulent than would otherwise be the case. This prevention of eddy currents in the space occupied by the cone 8 prevents dissipation of energy by turbulence and excessive mixing or agitation of the material. The apparatus shown, therefore, consumes appreciably less power for a given flow of liquid than would otherwise be the case.

The radius of curvature of the surfaces 7, 8 and 9 in Fig. 1 and that of curvature of ring 5 determine the direction of flow and rapidity of reversal of direction of flow and, therefore, influence the amount of turbulence occurring in the liquid as it passes through the channels defined thereby. It has been found that for vessels of normal size the radius of curvature of portions of the surfaces 7, 8 and 9 may be made between $\frac{1}{4}$ and 10 times the diameter of the vessel 1. The radius of curvature of the surface of the ring 5 has been found to be satisfactory when portions of the surface of the ring 5 are on a radius of curvature equal to about $\frac{1}{10}$ of the diameter of the vessel 1.

I claim:

1. In an apparatus of the character described, a vessel having an annular trough-shaped bottom curvilinear in cross section, means for circulating liquid in said vessel in vertical planes, said means including a propeller, and curved guiding walls coacting with the curvilinear bottom, to produce substantially non-turbulent flow of the liquid.

2. In a device of the character described, a vessel having a dished bottom, means for setting up circulatory motion of liquid in said vessel, a wall interposed within said circulatory path, the end of said wall being convex, and a concave wall opposite a portion of said convex surface.

3. In a device of the character described, a vessel having a dished bottom, means for moving liquid in said vessel, a wall forming a channel through which said liquid flows, and a removable liner whose surface is shaped to coact with said wall to cause non-turbulent flow of said liquid.

4. In a device of the character described, a vessel, means for moving liquid in said vessel, a wall forming a channel through which said liquid flows, and means for gradually spreading said liquid in different directions and returning it to said channel, the radius of curvature of said means being between ¼ and 10 times the diameter of said vessel.

5. In an apparatus of the character described, a vessel having an annular trough-shaped bottom curvilinear in cross section, a propeller, and a concentric wall within said vessel and spaced from the walls thereof, the bottom of said vessel and said wall being curved to coact to cause non-turbulent flow of a liquid therebetween.

6. In an apparatus of the character described, a vessel having an annular trough-shaped bottom curvilinear in cross section, a propeller, and a cylindrical wall within said vessel and spaced from the top, bottom and sides thereof, said wall and said vessel being curved to produce substantially non-turbulent flow of a liquid therebetween.

7. In a device of the character described, a vessel; a propeller, and a cylindrical wall vertically disposed within said vessel and having a rounded lower edge; the inner surface of the bottom of said vessel comprising a central portion of convex shape and a concave portion merging into the base of said central convex portion, said vessel and said cylindrical wall being adapted to coact to cause non-turbulent flow of a liquid within said vessel.

8. In a device of the character described, a vessel, means for moving liquid in said vessel, a wall forming a channel through which said liquid flows, means for gradually spreading said liquid in different directions and leading to said channel, the radius of curvature of said means being between ¼ and 10 times the diameter of said vessel, and said wall having its lower edge made with a radius of curvature about $\frac{1}{10}$ of the diameter of said vessel.

9. In a device of the character described, a vessel; a cylindrical wall vertically disposed within said vessel and spaced from the top, bottom and sides thereof; and a propeller within said cylindrical wall near the top thereof; said cylindrical wall having a thickened rounded lower edge; the inner surface of the bottom of said vessel having the shape of a surface of revolution, whose radial cross-section between the axis of revolution and the wall of the vessel comprises a continuous curve having only one point of inflection, an axial portion which is a curve adapted on rotation to give a convex surface with its apex lying on the axis, a middle portion which is an arc of a circle, whose radius of curvature is greater than that of the rounded lower edge of said cylindrical wall, and an end portion, said axial portion merging at the point of inflection with one end of said middle portion, and said end portion merging with the other end of said middle portion; and the axis of said cylindrical wall and said axis of revolution being substantially in alignment.

10. In a device of the character described, a vessel; a cylindrical wall centrally and vertically disposed within said vessel, said cylindrical wall having interiorly disposed, radially projecting, vertical baffles, the lower edge of said cylindrical wall being thickened and rounded, the radius of curvature of said rounded portion being about $\frac{1}{10}$ of the diameter of said vessel; a propeller operatively within the upper end of said cylindrical wall; and a liner for the bottom of said vessel, said liner comprising a central portion of convex shape with its apex below the bottom of said cylinder, the axes of said central portion and said cylindrical wall being substantially in alignment, and a concave portion merging into the base of said central convex portion, the radius of curvature of said concave portion being between ¼ and 10 times the diameter of said vessel; said concave portion and said rounded edge being adapted to coact to cause non-turbulent flow of a liquid within said vessel.

11. In an apparatus of the character described, a vessel having an annular trough-shaped bottom curvilinear in cross section, a concentric guiding wall disposed adjacent the bottom, and an agitator for causing circulation of liquid in said vessel in vertical planes.

12. In an apparatus of the character described, a vessel having an annular trough-shaped bottom curvilinear in cross section, a concentric cylindrical guiding wall disposed adjacent the bottom, and a propeller agitator enclosed within said wall.

13. In an apparatus of the character described a vessel having an annular trough-shaped bottom curvilinear in cross section, a concentric cylindrical guiding wall disposed adjacent the bottom and having an externally beaded lower edge, vertically disposed baffles upon the interior of said guiding wall, and a propeller agitator enclosed within said wall.

14. In an apparatus of the character described, a vessel having an annular trough-shaped bottom curvilinear in cross section, means for setting up motion of liquid in said vessel in a circulatory path in vertical planes, a concentric wall interposed within said circulatory path, said wall being vertically curved on opposite surfaces to avoid substantially all turbulent flow of liquid therearound.

15. In an apparatus of the character described, a vessel having an annular trough-shaped bottom curvilinear in cross section, means for setting up motion of liquid in said vessel in a circulatory path in vertical planes, a concentric wall interposed within said circulatory path, one edge of said wall being thickened and rounded.

16. In an apparatus of the character described, a vessel having an annular trough-shaped bottom curvilinear in cross section, means for setting up motion of liquid in said vessel in a circulatory path in vertical planes, a concentric wall interposed within said circulatory path, said wall having one of its edges made with a radius of curvature about $\frac{1}{10}$ of the diameter of said vessel.

In testimony whereof I affix my signature.

JUSTIN F. WAIT.